United States Patent [19]

Rebhan et al.

[11] Patent Number: 6,005,049

[45] Date of Patent: *Dec. 21, 1999

[54] PROCESS FOR THE PRODUCTION OF POLYPROPYLENE

[75] Inventors: David Merrill Rebhan, Charleston, W. Va.; David Albin Wibbenmeyer, Victoria, Tex.

[73] Assignee: Union Carbide Chemicals & Plastics Technology Corporation, Danbury, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/094,477

[22] Filed: Jul. 19, 1993

[51] Int. Cl.$^6$ ..................................... C08F 110/06
[52] U.S. Cl. ..................... 525/53; 526/124.1; 526/124.2; 526/351
[58] Field of Search ............................... 525/53; 526/106, 526/124.1, 351, 901, 124.2

[56] References Cited

U.S. PATENT DOCUMENTS 5,093,415  3/1992  Brady, III et al. ........................ 525/53
5,096,868  3/1992  Hsien et al. ............................ 526/105

FOREIGN PATENT DOCUMENTS 263779    7/1983   Germany .
59140205  11/1991  Japan .

OTHER PUBLICATIONS

Dean, "Langes Handbook of Chemistry" (Cite to Definition of Reynold's Number) pp. 10–96 (1985) McGraw Hill.

*Primary Examiner*—Cecilia J. Tsang
*Assistant Examiner*—Patrick R. Delaney
*Attorney, Agent, or Firm*—P. A. Doody

[57] ABSTRACT

A process for the production of polypropylene comprising continuously contacting liquid propylene or a mixture comprising liquid propylene and one or more other alpha-olefins in one or more reaction zones, under gas phase polymerization conditions, with a catalyst system comprising (i) a solid particulate catalyst precursor, which includes magnesium; titanium; a halogen which is chlorine, bromine, or iodine, or mixtures thereof; and, as an inside electron donor, a carboxylic acid ester; (ii) a hydrocarbylaluminum cocatalyst; and (iii) as an outside electron donor, a silicon compound containing at least one silicon-oxygen-carbon linkage, the particles of precursor being carried into the reaction zone(s) via a portion of the liquid propylene, the flow rate of said portion having a Reynolds number greater than about 15,000.

8 Claims, No Drawings

PROCESS FOR THE PRODUCTION OF POLYPROPYLENE

TECHNICAL FIELD

This invention relates to a process for the production of polypropylene having a commercially desirable resin morphology.

BACKGROUND INFORMATION

In U.S. Pat. No. 5,093,415, a process is provided for producing stereoregular polymers. More particularly, it was found that polymers having an isotactic index of at least 96 percent could be prepared in high yield at high production rates by polymerizing an alpha-olefin in a low pressure gas phase fluidized bed process at temperatures in excess of 50° C. employing a catalyst system comprising (i) a solid catalyst precursor, which includes magnesium, titanium, halogen, and an inside electron donor, i.e., a polycarboxylic acid ester containing two coplanar ester groups attached to adjacent carbon atoms; (ii) a hydrocarbylaluminum cocatalyst; and (iii) an outside electron donor or selectivity control agent, i.e., a silicon compound containing a silicon-oxygen-carbon linkage wherein the atomic ratio of aluminum to silicon is in the range of about 0.5:1 to about 100:1 and the atomic ratio of aluminum to titanium is in the range of about 5:1 to about 300:1.

This catalyst system can be used to provide homopolymers of propylene and copolymers of propylene and one or more alpha-olefins. The high activity at temperatures in the range of about 50° C. to about 110° C. makes this catalyst system very attractive; however, it is also desired to control average particle size within prescribed limits while maintaining high bulk density. Homopolymers can generate excessive fines raising the concern of a possible dust explosion. Random copolymers can become too large presenting the problems of poor flowability and low bulk density. Fines, flowability, and bulk density are dependent on average particle size, which is in turn dependent on resin morphology.

DISCLOSURE OF THE INVENTION

An object of this invention, therefore, is to provide a process for the production of polypropylene having improved resin morphology.

Other objects and advantages will become apparent hereinafter.

According to the present invention, a process for the production of polypropylene has been discovered comprising continuously contacting liquid propylene or a mixture comprising liquid propylene and one or more other alpha-olefins, in one or more reaction zones, under gas phase polymerization conditions, with a catalyst system comprising (i) a solid particulate catalyst precursor, which includes magnesium; titanium; a halogen which is chlorine, bromine, or iodine, or mixtures thereof; and, as an inside electron donor, a carboxylic acid ester; (ii) a hydrocarbylaluminum cocatalyst; and (iii) as an outside electron donor, a silicon compound containing at least one silicon-oxygen-carbon linkage, the particles of precursor being carried into the reaction zone(s) via a portion of the liquid propylene, the flow rate of said portion having a Reynolds number greater than about 15,000.

DESCRIPTION OF THE PREFERRED EMBODIMENT(S)

The solid particulate catalyst precursor, a complex, can be prepared by halogenating a magnesium compound of the formula MgRR' wherein R is an alkoxide or aryloxide group and R' is an alkoxide or aryloxide group or a halogen with a halogenated tetravalent titanium compound containing at least two halogen atoms in the presence of a halohydrocarbon and a monocarboxylic acid ester or polycarboxylic acid ester containing two coplanar ester groups attached to adjacent carbon atoms. The alkoxide groups can contain 1 to 8 carbon atoms and the aryloxide groups 6 to 10 carbon atoms. The halogen can be chlorine, bromine, or iodine.

Suitable magnesium compounds are magnesium diethoxide, magnesium diisopropoxide, magnesium di-n-butoxide, magnesium diphenoxide, magnesium dinaphthoxide, ethoxy magnesium isobutoxide, ethoxy magnesium phenoxide, naphthoxy magnesium isoamyloxide, ethoxy magnesium bromide, isobutoxy magnesium chloride, phenoxy magnesium iodide, cumyloxy magnesium bromide, and naphthoxy magnesium chloride.

The halogenated tetravalent titanium compound contains at least two halogen atoms and can have up to two alkoxy and/or aryloxy groups. Examples are $TiCl_4$, $TiBr_4$, diethoxy titanium dibromide, isopropoxy titanium triiodide, dihexoxy titanium dichloride, and phenoxy titanium trichloride.

The halohydrocarbon, while preferably aromatic, can be aliphatic or alicyclic. Suitable halohydrocarbons are chlorobenzene, bromobenzene, dichlorobenzene, dichlorodibromobenzene, chlorotoluene, dichlorotoluene, chloronaphthalene, dibromomethane, trichloromethane, 1,2-dichloroethane, trichloroethane, dichlorofluoroethane, hexachloroethane, trichloropropane, chlorobutane, dichlorobutane, chloropentane, trichlorofluorooctane, tetrachloroisooctane, dibromodifluorodecane, dibromocyclobutane, and trichlorocyclohexane.

The halogenated tetravalent titanium compound and the halohydrocarbon preferably contain no more than 12 carbon atoms.

Suitable polycarboxylic acid esters can be characterized by a molecularly rigid structure wherein two ester groups are attached to adjacent carbon atoms of the molecule and lie in a single plane. Such esters include polycarboxylic acid esters containing two ester groups which are attached to (a) ortho carbon atoms of a monocyclic or polycyclic aromatic ring, each of said ester groups being further linked to a branched or unbranched chain hydrocarbon radical; (b) vicinal carbon atoms of a non-aromatic monocyclic or polycyclic ring and which lie in a syn configuration with respect to each other, each of said ester groups being further linked to a branched or unbranched chain hydrocarbon radical; or (c) vicinal double bonded carbon atoms of an unsaturated aliphatic compound and which lie in a syn configuration with respect to each other, each of said ester groups being further linked to a branched or unbranched chain hydrocarbon radical.

These polycarboxylic acid esters can be derived from a suitable polycarboxylic acid and a monohydric alcohol having a linear hydrocarbon moiety which may be branched or unbranched. Examples of polycarboxylic acid esters are dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl-1,2-fluorenedicarboxylate, diisopropyl-1-,2-ferrocenedicarboxylate, cis-diisobutyl-cyclobutane-1,2-dicarboxylate, endo-diisobutyl-5-norbornene-2,3-dicarboxylate, endo-diisobutyl-bicyclo[2.2.2]oct-5-ene-2-3-dicarboxylate, diisobutyl maleate, and diisoamyl citraconate.

Examples of monocarboxylic acid esters, which can be used as the inside electron donor, are as follows: ethyl and methyl benzoate, p-methoxy ethyl benzoate, p-ethoxy methyl benzoate, p-ethoxy ethyl benzoate, ethyl acrylate, methyl methacrylate, ethyl acetate, p-chloro ethyl benzoate, p-amino hexyl benzoate, isopropyl naphthenate, n-amyl toluate, ethyl cyclohexanoate and propyl pivalate.

Halogenation of the magnesium compound is effected employing an excess of titanium compound, about 2 moles to about 100 moles of titanium compound per mole of magnesium compound. The halohydrocarbon is employed in an amount sufficient to dissolve the titanium compound and the ester, and to adequately disperse the solid, insoluble magnesium compound. The magnesium compound can be used in an amount of about 0.005 to 2.0 moles of magnesium compound per mole of halohydrocarbon and the ester in an amount of about 0.0005 to about 2.0 moles of ester per mole of titanium compound. The halogenation of the magnesium compound can be carried out in a temperature range of about 60° C. to about 150° C. over a period of about 0.1 to about 6 hours. The halogenated product is a solid material which can be isolated from the liquid reaction medium by filtration or decantation. After separation, it is treated one or more times with the titanium compound in the same molar ratio to remove residuals and maximize catalyst activity. The halohydrocarbon is usually employed during this treatment to dissolve the titanium compound and disperse the halogenated product. The treatment is preferably carried out twice, the second treatment being in the presence of a polycarboxylic acid halide containing two coplanar acid groups attached to adjacent carbon atoms where the electron donor is a polycarboxylic acid ester. About 5 to about 200 millimols of acid halide are generally employed per gram atom of magnesium. Suitable acid halides include phthaloyl dichloride, 2,3-naphthalene di-carboxylic acid dichloride, endo-5-norbornene-2,3-dicarboxylic acid dichloride, maleic acid dichloride, and citraconic acid dichloride.

After the solid halogenated product has been treated one or more times with additional halogenated tetravalent titanium compound, it is separated from the liquid reaction medium, washed with an inert hydrocarbon to remove unreacted titanium compounds, and dried. The final washed product suitably has a titanium content of about 0.5 percent by weight to about 6.0 percent by weight. The atomic ratio of titanium to magnesium in the final product is in the range of about 0.01:1 to about 0.2:1. The mono- or polycarboxylic acid ester can be present in the solid catalyst precursor in a molar ratio of ester to magnesium of about 0.005:1 to about 10:1.

The hydrocarbyl aluminum cocatalyst can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be alike or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl, and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnaphthyl, cyclohexyl, cycloheptyl, and cyclooctyl.

Examples of suitable hydrocarbyl aluminum compounds are as follows: triisobutylaluminum, trihexylaluminum, di-isobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tripropyaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred hydrocarbyl aluminums are triethylaluminum, triisobutylaluminum, trihexylaluminum, di-isobutylaluminum hydride, and dihexylaluminum hydride.

The silicon compounds include compounds having the formula $R_aSiY_bX_c$ wherein R is a hydrocarbon radical having 1 to 20 carbon atoms; Y is —OR or —OCOR; and X is hydrogen, chlorine, bromine, or iodine; each R and Y are the same or different; a is an integer from 0 to 3; b is an integer from 1 to 4; c is 0 or 1; and $a+b+c=4$. R can be substituted or unsubstituted. Silicon compounds containing Si-O-Si groups can also be employed providing that at least one Si-O-C group is present. Examples of useful silicon compounds are diphenyldimethoxysilane, n-propyltrimethoxy-silane, di-tert-butyldimethoxysilane, diphenyldiisobutoxysilane, diisobutyldimethoxysilane, and dimethyldiethoxysilane.

The polymer is prepared in the gas phase, generally, by continuously contacting the catalyst system described above with propylene or a mixture of comonomers comprising propylene and one or more other alpha-olefins in one or more fluidized bed reactors such as that described in U.S. Pat. No. 4,482,687 or another conventional reactor for the gas phase production of, for example propylene homopolymers or copolymers.

In a fluidized bed or another gas phase reactor, there usually is a catalyst precursor feed line or another suitable conduit such as an injection tube through which the particulate precursor is flushed into the reactor using a small portion of the liquid propylene as a carrier. The portion of the liquid propylene used for this purpose can be about 0.1 to about 11 percent by weight based on the weight of the total liquid propylene introduced into the reactor, and is preferably about 0.15 to about 7.5 percent by weight. The flow rate of this liquid carrier has a Reynolds number greater than about 15,000, preferably greater than about 20,000. The Reynolds number preferred range is about 20,000 to about 400,000. The Reynolds number, as it is used in context, is described in the Chemical Engineers Handbook, 5th Edition, edited by Perry et al, publ. by McGraw Hill, New York, 1973, Section 5, page 4.

In this specification, the term "copolymer" is considered to mean a polymer based on propylene and one or more comonomers. The alpha-olefin comonomers can have 2 or 4 to 12 carbon atoms. Additional comonomers such as conjugated or non-conjugated dienes containing 5 to 25 carbon atoms can also be included in the mixture of comonomers to be polymerized. Useful alpha-olefins preferably do not contain any branching on carbon atoms closer than two carbon atoms removed from the double bond. Examples of suitable alpha-olefins include ethylene, 1-butene, 1-hexene, 4-methylpentene-1, 1-heptene, and 1-octene. Examples of the dienes are 1,4-pentadiene, 1,4-hexadiene, 1,5-hexadiene, dicyclopentadiene, cyclohexadiene, 1-vinyl-1-1-cyclopentene, and the alkylbicyclononadienes, indenes, and norbornenes. Ethylidene norbornene is an example of the latter. The non-conjugated dienes are preferred.

In the copolymer, the portion attributed to propylene can be in the range of about 80 to about 99.5 percent by weight based on the weight of the copolymer and is preferably in the range of about 85 to about 99.5 percent by weight; the portion attributed to the second comonomer can be in the range of about 0.5 to about 20 percent by weight and is preferably in the range of about 0.5 to about 15 percent by weight; and the portion attributed to other comonomers, if any, can be in the range of about 0.5 to about 20 percent by weight. All percentages are based on the weight of the copolymer. The copolymers are preferably propylene/ethylene copolymers and propylene/1-butene copolymers, the ethylene or 1-butene being present in an amount of about 3 to about 15 percent by weight based on the weight of the copolymer, and the balance of the copolymer being propylene.

The fluidized bed, or other gas phase, reactor can be operated at a temperature in the range of about 50° C. to about 150° C. and is preferably operated at a temperature in the range of about 60° C. to about 90° C. The operating pressure can be in the range of about 200 psig to about 650 psig or higher and is preferably about 250 psig to about 550 psig. The partial pressure of the propylene (first comonomer) can be in the range of about 50 to about 600 psi and is preferably about 150 to about 500 psi. The partial pressure of the second comonomer can be in the range of about 0.25 to about 50 psi and is preferably about 1 to about 40 psi. The total partial pressure of other comonomers can be about 0.5 to about 75 psi. The superficial gas velocity, which can be calculated by measuring cycle gas flow, is, generally, maintained in the range of about 0.1 to about 5 feet per second and is preferably in the range of about 0.5 to about 2 feet per second. The superficial gas velocity is preferably used together with a slow transition in order to optimize the results.

The residence time of the alpha-olefin(s) in the reactor can be in the range of about 1 to about 20 hours and is preferably in the range of about 2 to about 6 hours. Hydrogen or another chain transfer agent can be used in the process. The molar ratio of hydrogen to alpha-olefin used in the fluidized bed reactor can be in the range of about 0.0005:1 to about 0.2:1 and is preferably in the range of about 0.01:1 to about 0.1:1. This translates into a hydrogen partial pressure in the range of about 0.1 psi to about 200 psi and preferably about 0.5 psi to about 50 psi. The balance of the operating pressure utilized in the reactor, i.e., after the partial pressure of propylene, other comonomers, and the hydrogen partial pressure are considered, can be made up by using an inert gas such as nitrogen.

Where it is desired to produce random copolymers, one fluidized bed reactor will suffice. In the case of impact grade copolymers, a second fluidized bed is needed.

The atomic or molar ratios of catalyst components can be about as follows:

| Ratio | Broad Range | Preferred Range |
| --- | --- | --- |
| Mg to Ti | 1:1 to 50:1 | 3:1 to 30:1 |
| Halogen to Mg | 1.1 to 5:1 | 2:1 to 3:1 |
| Mg to inside electron donor | 0.1:1 to 100:1 | 1:1 to 60:1 |
| Al to Ti | 5:1 to 300:1 | 10:1 to 200:1 |
| Al to selectivity control agent (SCA) | 0.5:1 to 100:1 | 1:1 to 75:1 |

In U.S. Pat. No. 4,414,132, there is described a catalyst system, which is similar to the catalyst system described above except that its selectivity control agent (outside electron donor) is a carboxylic acid ester. A typical example of the catalyst precursor is:

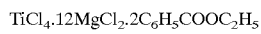

and the selectivity control agent is para-ethoxy ethyl benzoate. It is found that changing the liquid propylene carrier flow rate using this catalyst system has no effect on resin morphology.

Resin particles less than 120 mesh (0.125 millimeters in diameter) are considered fines. It is desirable to have less than 5 percent by weight fines to improve the handling characteristics of the resin and to minimize the possibility of a dust explosion. Resin particles greater than 5 mesh (4.0 millimeters in diameter) are considered large. It is desirable to have less than 5 percent by weight resin particles larger than 4.0 millimeters in diameter to prevent flowability problems and to maintain high bulk density. Average particle sizes between about 0.5 and about 1.0 millimeter are preferred. Bulk densities less than 15 pounds per cubic foot are considered low. Between 15 and 18 pounds per cubic foot, bulk density is considered normal. High bulk density is defined as being greater than 18 pounds per cubic foot.

Homopolymers and low comonomer content random copolymers can generate excessive fines. For these resins, a low catalyst carrier flow rate is desirable to maintain higher average particle size. During the production of random copolymers, average particle size increases with increasing comonomer content. At the same time, bulk density decreases. Thus, for high comonomer content copolymers, it is desirable to maintain a high catalyst carrier flow rate to reduce particle size and preserve high bulk density.

The advantage of this invention is the ability to control average particle size within commercially desirable limits while maintaining high bulk density, and, at the same time, maintaining catalyst activity and selectivity at the same high level regardless of changes in catalyst carrier flow rate. The control is effected within a range of Reynolds numbers such that the minimum Reynolds number is about 15,000, preferably 20,000, and the maximum Reynolds number is about 400,000. This also permits the control of fines and large particles in the final resin product.

The patents mentioned in this specification are incorporated by reference herein.

The invention is illustrated by the following examples.

EXAMPLE 1

This example shows the effect of catalyst carrier flow rate on average particle size and bulk density during production of 3.6 to 4.1 weight percent ethylene/96.4 to 95.9 weight percent propylene copolymer. High catalyst carrier flow rate reduces average particle size and increases bulk density to more desirable levels.

To a solution of 70 milliliters of titanium tetrachloride (120 grams, 0.64 mol) in 3.7 liters of chlorobenzene are added, in succession, 180 milliliters of diisobutyl phthalate (187 grams, 0.67 mol), 590 grams (5.2 mols) of magnesium diethoxide, and a solution of 4.7 liters of titanium tetrachloride (8100 grams, 43 mols) in 1.2 liters of chlorobenzene. A temperature of 20° C. to 25° C. is maintained during these additions. The resulting mixture is then heated to 110° C. with stirring, the temperature being maintained for 1 hour. At the end of this time, the mixture is filtered while hot. A solid material is collected.

The solid material is then slurried in a solution of 4.7 liters of titanium tetrachloride (8100 grams, 43 mols) in 1.2 liters of chlorobenzene at room temperature. A solution of 45 grams (0.22 mol) of phthaloyl dichloride in 3.7 liters of chlorobenzene is added to the slurry at room temperature, and the resulting slurry is then heated to 110° C. with stirring, the temperature being maintained for 30 minutes. At the end of this time, the mixture is filtered while hot. A solid material is collected.

The solid material is reslurried in a solution of 4.7 liters of titanium tetrachloride (8100 grams, 43 mols) in 1.2 liters of chlorobenzene at room temperature. An additional 3.7 liters of chlorobenzene is then added to the slurry at room temperature, and the resulting slurry is heated to 110° C. with stirring, the temperature being maintained for 30 minutes. At the end of this time the mixture is filtered while hot. A solid material is collected.

The solid material is reslurried once again in a solution of 4.7 liters of titanium tetrachloride (8100 grams, 43 mols) in 1.2 liters of chlorobenzene at room temperature. An additional 3.2 liters of chlorobenzene is then added to the slurry at room temperature, and the resulting slurry is heated to 110° C. with stirring, the temperature being maintained for 30 minutes. At the end of this time, the mixture is filtered while hot. The residue is washed 6 times with 500 milliliter portions of hexane at 25° C., and then dried under a nitrogen purge. The product is particulate and weighs about 500 grams. This is the solid catalyst precursor.

The particulate solid catalyst precursor is continuously fed into a fluidized bed reactor through an injection tube using liquid propylene as a carrier. The portion of the total liquid propylene fed into the reactor, which is used as a catalyst precursor carrier, is 2.5 percent by weight based on the weight of the total liquid propylene. Simultaneously, and continuously, triethylaluminum cocatalyst (TEAL) and n-propyltrimethoxy-silane (NPTMS) as selectivity control agent (SCA) are added to the reactor (as dilute solutions in isopentane).

Liquid propylene, ethylene, hydrogen, and nitrogen are added to maintain a specified total pressure. The reactor feeds are accomplished through the use of tubes fitted with motor valves and orifices. The resin product is transferred from the fluidized bed to a purge bin in which the resin flows downward by gravity and humidified nitrogen flows upward so that the contained moisture can deactivate the catalyst components in the resin to reduce odor.

The fluidized bed reactor is 12 feet in internal diameter and 43.5 feet in height. The injection tube is 0.305 inch in internal diameter and 16 feet in length. The propylene liquid has a density of 0.526 gram per cubic centimeter at 20° C. and 550 pounds per square inch (psi). The propylene liquid has a viscosity of 0.0735 centipoise at the same temperature and pressure.

Variables and results are set forth in Table I.

TABLE I

| run | A | B | C | D |
|---|---|---|---|---|
| Et % | 3.9 | 3.6 | 3.8 | 4.1 |
| C3PP (psi) | 335 | 334 | 331 | 334 |
| cat. prod. (mlbs/lb) | 19.4 | 21.8 | 16.6 | 14.9 |
| carrier flow rate (lbs/hr) | 125 | 850 | 850 | 120 |
| Reynolds number | 34,000 | 230,000 | 230,000 | 33,000 |
| APS (inch) | 0.0486 | 0.0284 | 0.0204 | 0.0354 |

TABLE I-continued

| run | A | B | C | D |
|---|---|---|---|---|
| bulk density (lbs/cu ft) | 16.2 | 19.1 | 18.0 | 15.6 |
| sieve analysis: | | | | |
| %5 mesh | 3.1 | 0.0 | 0.0 | 0.5 |
| %10 mesh | 12.7 | 1.6 | 0.0 | 6.6 |
| %18 mesh | 29.1 | 20.4 | 10.9 | 21.1 |
| %35 mesh | 36.7 | 42.8 | 33.0 | 36.4 |
| %60 mesh | 12.2 | 17.0 | 30.7 | 24.4 |
| %120 mesh | 6.6 | 18.8 | 21.7 | 9.0 |
| %<120 mesh | 0.0 | 0.0 | 3.7 | 0.0 |

EXAMPLE 2

Example 1 is repeated except for certain variables. The object is to produce a copolymer containing 3.2 to 3.3 percent by weight ethylene and 96.7 to 96.8 percent by weight propylene. Again, the high catalyst carrier flow rate reduces average particle size and increases bulk density to more desirable levels. Variables and results are set forth in Table II.

TABLE II

| run | E | F |
|---|---|---|
| Et % | 3.2 | 3.3 |
| C3PP (psi) | 338 | 348 |
| cat. prod. (mlbs/lb) | 22.0 | 24.6 |
| carrier flow rate (lbs/hr) | 120 | 300 |
| Reynolds number | 33,000 | 82,500 |
| APS (inch) | 0.0364 | 0.0261 |
| bulk density (lbs/cu ft) | 16.9 | 21.3 |
| sieve analysis: | | |
| %5 mesh | 0.5 | 0.0 |
| %10 mesh | 6.2 | 1.3 |
| %18 mesh | 25.4 | 16.1 |
| %35 mesh | 38.5 | 40.0 |
| %60 mesh | 17.6 | 30.4 |
| %120 mesh | 11.3 | 11.2 |
| %<120 mesh | 0.0 | 0.4 |

EXAMPLE 3

Example 1 is repeated except for certain variables. The object is to produce a copolymer containing 5.3 to 5.5 percent by weight ethylene and 94.5 to 94.7 percent by weight propylene. High catalyst carrier flow rates reduce average particle sizes and increase bulk density to more desirable levels. Variables and results are set forth in Table III.

TABLE III

| run | G | H |
|---|---|---|
| Et % | 5.3 | 5.5 |
| C3PP (psi) | 340 | 305 |
| carrier flow rate (lbs/hr) | 120 | 850 |
| Reynolds number | 33,000 | 230,000 |
| sieve analysis: | | |
| % greater than 5 mesh | 8.0 | 1.5 |

EXAMPLE 4

Example 1 is repeated except for certain variables. The object is the production of a homopolymer of propylene. In this example, low catalyst carrier flow rates reduce the fines to a more desirable level. Variables and results are set forth in Table IV.

TABLE IV

| run | I | J |
|---|---|---|
| carrier flow rate (lbs/hr) | 110 | 550 |
| Reynolds number | 30,000 | 151,000 |
| sieve analysis: | | |
| % less than 120 mesh | 10.5 | 20.0 |

Notes to Tables:
1. Et %=the percent by weight ethylene based on the total weight of the mixture of propylene and ethylene.
2. C3PP (psi)=the partial pressure of propylene in pounds per square inch.
3. cat. prod. (mlbs/lb)=the productivity of the catalyst precursor in thousand pounds of propylene/ethylene copolymer per pound of catalyst precursor.
4. carrier flow rate (lbs/hr)=the flow rate of the liquid propylene carrier in pounds per hour. In examples 2, 3, and 4, the carrier flow rate is estimated from Delta P across the injection tube control valve and orifice plate.
5. Reynolds number is described above.
6. APS (inch)=the average particle size (diameter) of the copolymer produced in inches.
7. bulk density (lbs/cu ft)=the settled bulk density of the copolymer in pounds per cubic foot.
8. sieve analysis=the percent by weight of copolymer that is retained on various mesh sizes in meshes per lineal inch (U.S. Sieve Series).

We claim:
1. A process for the production of polypropylene comprising continuously contacting liquid propylene or a mixture comprising liquid propylene and one or more other alpha-olefins in one or more reaction zones, under gas phase polymerization conditions, with a catalyst system comprising (i) a solid particulate catalyst precursor, which includes magnesium; titanium; a halogen which is chlorine, bromine, or iodine, or mixtures thereof; and, as an inside electron donor, a carboxylic acid ester; (ii) a hydrocarbylaluminum cocatalyst; and (iii) as an outside electron donor, a silicon compound containing at least one silicon-oxygen-carbon linkage, with the proviso that the precursor alone is carried into the reaction zone(s) via a portion of the liquid propylene, the amount of said portion being about 0.1 to about 11 percent by weight based on the weight of the total liquid propylene and the flow rate of said portion being at least 110 pounds per hour and having a Reynolds number greater than about 33,000.

2. A process comprising contacting liquid propylene or a mixture comprising liquid propylene and one or more other alpha-olefins in one or more fluidized bed reactors, under gas phase polymerization conditions, with a catalyst system comprising (i) a solid catalyst precursor which includes magnesium; titanium; a halogen which is chlorine, bromine, or iodine, or mixtures thereof; and a polycarboxylic acid ester containing two coplanar ester groups attached to adjacent carbon atoms; (ii) a trialkylaluminum cocatalyst; and (iii) an alkyltrialkoxysilane or a dialkyldialkoxysilane, with the proviso that the precursor alone is carried into the reaction zone(s) via a portion of the liquid propylene, the amount of said portion being about 0.15 to about 7.5 percent by weight based on the weight of the total liquid propylene and the flow rate of said portion being at least 110 pounds per hour and having a Reynolds number greater than about 33,000.

3. The process defined in claim 1 carried out under about the following conditions:
(i) temperature: 55° C. to 110° C.;
(ii) atomic ratio of aluminum to titanium: 20 to 200;
(iii) molar ratio of aluminum to silicon compound: 2 to 50; and
(iv) propylene partial pressure: 50 to 450 psi.

4. The process defined in claim 1 wherein the maximum flow rate is represented by a Reynolds number of about 400,000.

5. The process defined in claim 1 wherein one or more of the reaction zones are fluidized beds.

6. The process defined in claim 1 wherein the acid ester is a polycarboxylic acid ester containing two coplanar ester groups attached to adjacent carbon atoms.

7. The process defined in claim 1 wherein the hydrocarbyl aluminum cocatalyst is a trialkylaluminum.

8. The process defined in claim 1 wherein the silicon compound has the formula:

$$R_a SiY_b X_c$$

wherein R is a hydrocarbon radical having 1 to 20 carbon atoms; Y is —OR or —OCOR; and X is hydrogen, chlorine, bromine, or iodine; each R and Y are the same or different; a is an integer from 0 to 3; b is an integer from 1 to 4; c is 0 or 1; and $a+b+c=4$.

* * * * *